July 4, 1933.  A. E. ANDERSON  1,917,083
SYSTEM OF ELECTRIC DISTRIBUTION
Filed July 22, 1931
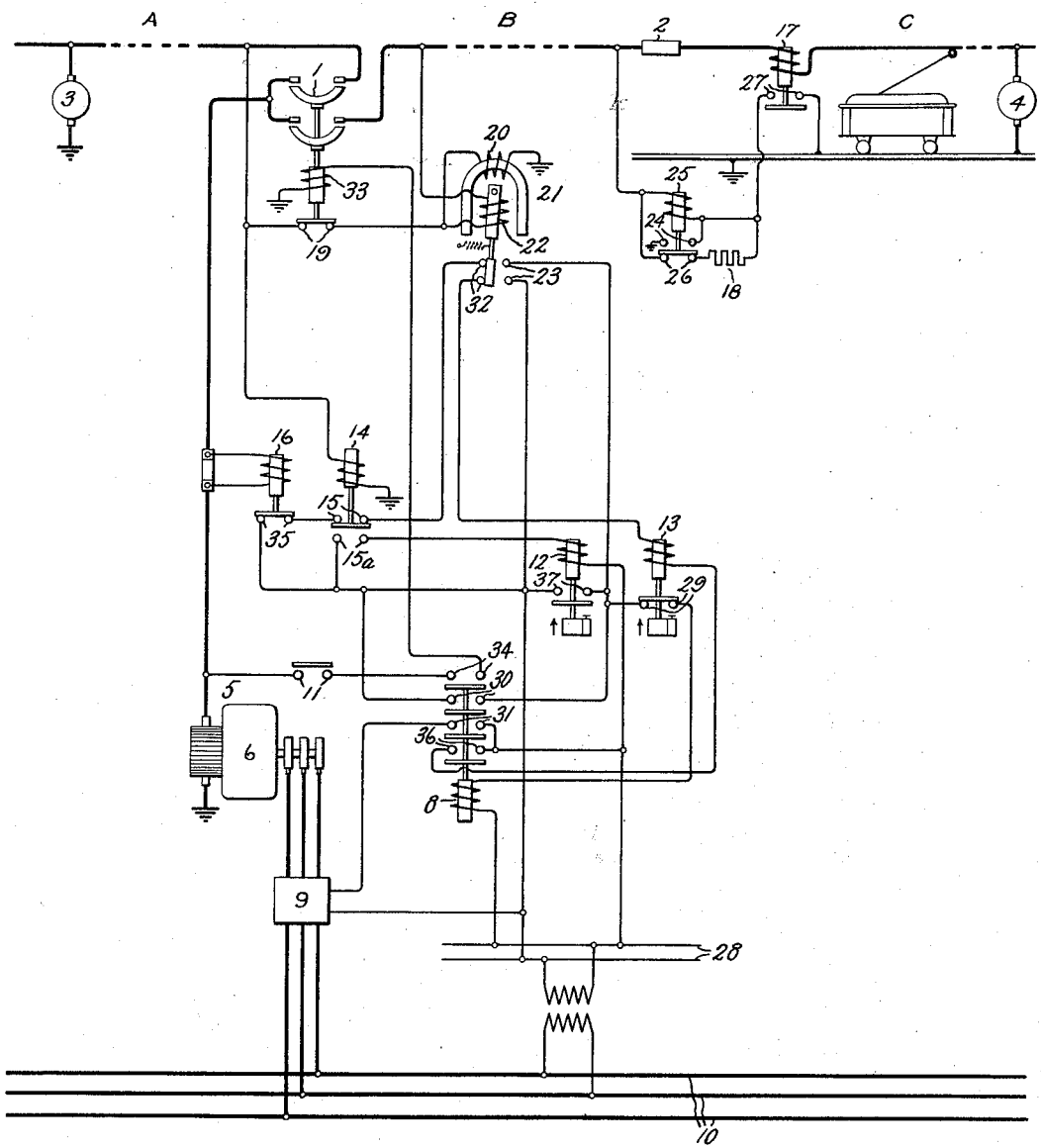
Inventor:
Arvid E. Anderson,
by Charles E. Jullar,
His Attorney.

Patented July 4, 1933

1,917,083

UNITED STATES PATENT OFFICE

ARVID E. ANDERSON, OF LANSDOWNE, PENNSYLVANIA, ASSIGNOR TO GENERAL ELECTRIC COMPANY, A CORPORATION OF NEW YORK

SYSTEM OF ELECTRIC DISTRIBUTION

Application filed July 22, 1931. Serial No. 552,447.

My invention relates to systems of electric distribution and particularly to systems for distributing electric energy to electric railways.

In electric railway systems, it is common practice to divide the trolley circuit into sections which are arranged to be disconnected from each other in such a manner that a fault on any section does not interrupt the supply of current to any other section. In such systems, suitable automatic substations may be located at different points along the trolley circuit to maintain the desired value of trolley voltage under all load conditions. These substations are arranged to start and supply current to the sections supplied thereby when the load connected to the sections exceeds predetermined amounts and are arranged to shut down when the current outputs thereof are below predetermined values. In most cases, the sections supplied by an automatic station are arranged to be connected to another energized adjacent section when the automatic station is shut down so that when the load approaches a section to which the automatic station supplies current, the voltage of the section supplied by the automatic station decreases and effects the starting of the automatic station. Therefore the automatic station is in operation when the load is in the section to which the automatic station supplies current. In other cases, such factors as the length of sections or power interchange limitations makes it desirable to isolate a section from adjacent portions of the system and therefore the automatic station may receive no impulse to start as the load approaches the section supplied thereby. In such arrangements, it is necessary to wait until the load is actually connected to the section supplied by its station before the automatic station is started.

One object of my invention is to provide an arrangement which overcomes this difficulty by providing means for automatically effecting the starting of an automatic station arranged to supply current to a normally deenergized section upon the approach of the load to the deenergized section so that by the time the load is connected to the deenergized section, the automatic station has completed its starting operation and is connected to the section.

My invention will be better understood from the following description when taken in connection with the accompanying drawing which diagrammatically illustrates a system of electric distribution embodying my invention, and its scope will be pointed out in the appended claims.

In the accompanying drawing, the system of electric distribution comprises three sections A, B and C of a direct current trolley circuit, the adjacent sections A and B being arranged to be interconnected by means of a suitable switching device, such as a circuit breaker 1. It is assumed that the sections have a common return circuit such as the ground. The adjacent sections B and C are electrically disconnected from each other in any suitable manner as by means of an insulator 2. Therefore, when the circuit breaker 1 is opened, the section B is deenergized.

The sections A and C are arranged to be supplied with current from suitable sources 3 and 4 respectively, and the sections A and B are arranged to be supplied with current from a suitable source 5 when the circuit breaker 1 is closed. As shown in the drawing, the source 5 comprises an automatic station including a rotary converter 6. The automatic switching means associated with the converter 6 for effecting the starting thereof, and its connection to the supply and load circuits may be of any suitable type, examples of which are well known in the art. In order to simplify the disclosure, the entire automatic switching means is not shown but only the necessary portion thereof which is deemed necessary for a clear understanding of the present invention.

As shown in the drawing, the automatic switching means for the rotary converter 6 comprises a master relay 8 which, when energized, effects the operation of suitable switching means 9, not shown in detail, whereby the connection of the converter to the alternating current supply circuit 10 and the excitation of the converter are automatically controlled in any suitable manner to effect the starting of the converter and the proper polarity and magnitude of the direct current voltage of the converter when it reaches synchronous speed. The master relay 8, when deenergized, is arranged to effect the shutting down of the automatic station. Examples of suitable means for accomplishing these results are old and well known, in the art, and since such means constitute no part of my invention, it is unnecessary to complicate the disclosure of the present invention by showing them in detail.

As shown, the master relay 8 also controls the circuit breaker 1 so that the converter 6 is disconnected from the sections A and B when the master relay 8 is deenergized. The circuit breaker 1 is also controlled by other suitable means whereby the circuit breaker cannot be closed automatically until the converter 6 has reached the proper condition to supply current to the load. In order to indicate the use of such means for preventing the premature closing of the circuit breaker 1, contacts 11 are shown in the closing circuit of the circuit breaker.

The energization of the master relay 8 is controlled by two time relays 12 and 13 which control the circuit of the master relay 8 in such a manner that after the relay 12 has been energized for a predetermined length of time, while the time relay 13 is deenergized, the energization of the master relay 8 is effected, and after the time relay 13 has been energized for a predetermined length of time, it effects the deenergization of the master relay 8.

As shown in the drawing, the automatic station 5 is arranged to be started automatically as the load, such as a trolley car or an electric train, moves along the section A towards the end thereof adjacent to the circuit breaker 1, so that by the time the car reaches the section B, the automatic station 5 is in operation and connected to the section B. This result is accomplished by connecting the voltage relay 14 across the end of the section A adjacent to the circuit breaker 1. As the car approaches the end of the section A, the voltage drop between the car and the source 3 causes the voltage at the end of the section A adjacent to the circuit breaker 1 to decrease to such a value that the relay 14 opens its contacts 15 and closes its contacts 15a. The closing of the contacts 15a completes an energizing circuit for the time relay 12 which, after being energized for a predetermined length of time, effects the energization of the master relay 8 to start the automatic station 5. In order to maintain the automatic station in operation as long as the current output thereof exceeds a predetermined value, even if the voltage of the section A is normal, a current relay 16 is provided which is so connected that it responds to the current output of the converter. This relay 16 is arranged so that when the current output of the converter exceeds a predetermined value, it maintains the circuit of the time relay 13 open so that it cannot effect the deenergization of the master relay 8 and the shutting down of the automatic station 5.

Since the automatic station 5 is located at one end of the section B, it is evident that it would involve considerable expense to run a pilot wire from the section C to the automatic station in order to obtain an indication of the voltage across the section C to effect the starting of the automatic station 5 as a car approaches the end of the section C which is adjacent to section B. In accordance with my invention, however, I provide an arrangement which effects the starting of the automatic station 5 under such conditions without the necessity of providing any pilot wires between the automatic station 5 and the section C. In the embodiment of my invention shown in the drawing, I accomplish this result by connecting in series relation with the section C at a point near the end thereof, a current relay 17 so that when the car passes that point, when moving towards the section B, it effects the energization of the relay 17. The relay 17 then connects a relatively low resistance 18 across the section B. On the circuit breaker 1, I provide auxiliary contacts 19 which, when the circuit breaker 1 is open, connect the polarizing winding 20 of a polarized relay 21 across the section A and connect the operating winding 22 of the polarized relay in series between the sections A and B. Therefore, when the resistance 18 is connected across the section B by the relay 17, sufficient current flows in the proper direction through the operating winding 22 of the polarized relay 21 to cause the relay 21 to close its contacts 23. The closing of these contacts 23 is arranged to effect the energization of the master relay 8 so that by the time the trolley reaches the section B, the automatic station 5 is in operation and is connected to the section B.

In order to disconnect the resistor 18 from across the section B as soon as the automatic station 5 is connected thereto, I provide a voltage relay 25 which is connected across the section B when the contacts 27 are closed but which is not sufficiently energized to open its contacts 26 and close its contacts 24 until the winding 22 of the relay 21 is short circuited by the closing of the circuit breaker 1. The contacts 26 are connected in series with the resistor 18 so that, as soon as the voltage across the section B becomes normal, the relay 25 disconnects the low resistor 18 from across the section. By closing its contacts 24, the relay 25 completes a locking circuit for itself.

The operation of the arrangement shown in the drawing is as follows:

Let it be assumed that the automatic station 5 is shut down, the circuit breaker 1 is open and that a car is moving along the section C towards the section B, current being supplied from source 4. When the load passes the point where relay 17 is located, this relay becomes energized, and by closing its contacts 27 completes a circuit from the ungrounded side of section A, through contacts 19 of the open circuit breaker 1, winding 22 of polarized relay 21, ungrounded side of section B, then through contacts 26 of relay 25, and resistance 18, and through winding of relay 25 in parallel, to contacts 27 of relay 17 and to ground. The current in this circuit is in the proper direction and of sufficient magnitude to cause the relay 21 to open its contacts 32 and close its contacts 23. Sufficient current however does not flow through the winding of relay 25 to cause it to operate.

When the contacts 23 close, a circuit is completed for the master relay 8 from one side of a suitable control circuit 28 through the contacts 23 of relay 21, contacts 29 of relay 13, winding of relay 8 to the other side of the control circuit. The relay 8 by closing its contacts 30 completes a locking circuit for its winding through its contacts 30 which are connected in parallel with the contacts 23 so that the master relay 8 remains energized after the relay 21 opens its contacts 23. By closing its contacts 31 the relay 8 effects the operation of the automatic switching means 9 to start the automatic station 5. As soon as the converter 6 reaches the proper condition to be connected to the sections A and B, the contacts 11 are closed and a circuit is completed for the closing coil 33 of the circuit breaker 1. This circuit is from the ungrounded brush of the converter 6 through contacts 11, contacts 34 of the master relay 8, closing coil 33 of the circuit breaker 1 to ground. As soon as the circuit breaker 1 closes, the voltage across the section B increases to a sufficient value to cause the voltage relay 25 to open its contacts 26, disconnecting the resistor 18, and close its contacts 24, thereby completing across the section B a locking circuit for the winding of relay 25 which is independent of contacts 27. The circuit breaker 1, by opening its auxiliary contacts 19 interrupts the above-traced circuit for the winding 22 of the polarized relay 21. However due to the connection of one terminal of this winding to section B another energizing circuit for the windings of the relay 21 is completed from the ungrounded terminal of source 3 through the ungrounded conductor of section A, main contacts of circuit breaker 1, ungrounded conductor of section B, winding 22 of relay 21, winding 20 of relay 21 to the grounded terminal of source 3. Since the current in this circuit now flows from the ungrounded conductor of section B to the winding 22, the current through the winding 22 is in the opposite direction from what it was when the circuit breaker auxiliary contacts 19 were closed and current flowed from the winding 22 to the ungrounded conductor of section B. This reversal of current through the winding 22 effects the opening of contacts 23 and closing of contacts 32. A circuit is therefore completed for the time delay relay 13 if the load does not reach section B by the time the circuit breaker 1 has closed. This circuit for the time relay 13 is from one side of the control circuit 28 through the contacts 35 of the current relay 16, contacts 15 of the voltage relay 14, contacts 32 of polarized relay 21, winding of relay 13, contacts 36 of master relay 8 to the other side of the control circuit. Under normal conditions, however, the load will reach the section B before the time relay 13 has been energized for a sufficient length of time to open its contacts 29. As soon as the load reaches section B, the current output of the converter 6 increases to a sufficient value to cause the current relay 16 to open its contacts 35 and thereby interrupt the above-traced circuit for the time relay 13. The automatic station remains in operation as long as the load is connected to section B and until it reaches a point on section A where most of the current supplied thereto is taken from the source 3. Under such conditions the current relay 16 closes its contacts 35 and thereby completes the above-traced circuit for the time relay 13. After the relay 13 has been energized for a predetermined time, it opens its contacts 29 in the above-traced locking circuit for the master relay 8. The de-energization of the relay 8 opens the circuit of the closing coil 33 of the circuit breaker 1 so that this circuit breaker opens. By opening its contacts 31, the relay 8 also effects the operation of the switching means 9 to effect the shutting down of the automatic station 5.

When the car is moving in the opposite direction along section A and it reaches a point near the end of the section adjacent to section B, the voltage relay 14 opens its contacts 15 and closes its contacts 15a, thereby completing an obvious energizing circuit for the master relay 12 across the control circuit 28. After the relay 12 has been energized for a predetermined length of time, it closes its contacts 37 and completes, through the contacts 29 of the time relay 13, an energizing circuit for the master relay 8. The master relay 8 then effects, in the manner above described, the starting of the automatic station 5 and the closing of the circuit breaker 1 so that the section B is energized before the trolley reaches it. When the load moves from section B to C, the current output of the automatic station decreases to such a low value that the current relay 16 then effects the shutting down of the automatic station in the manner above described.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:—

1. In combination, a sectionalized circuit including two adjacent electrically isolated sections, a source of current for one of said sections, means for connecting said source to said one of said sections at a point remote from the adjacent ends of said two isolated sections, and means controlled through said one of said sections from said remote point to the other isolated section for effecting the operation of said connecting means in response to the location of the load on said other isolated section.

2. In combination, a sectionalized circuit including two adjacent electrically isolated sections, a source of current for one of said sections, means for connecting said source to said one of said sections at a point remote from the adjacent ends of said two isolated sections, a polarized relay for effecting the operation of said connecting means, an operating winding for said relay, and means responsive to the location of the load on the other isolated section for completing in series with the portion of said one of said sections between said remote point and the other isolated section an energizing circuit for said operating winding.

3. In combination, a sectionalized circuit including two adjacent electrically isolated sections, a source of current for one of said sections, means for connecting said source to said one of said sections at a point remote from the adjacent ends of said two isolated sections, a polarized relay for effecting the operation of said connecting means, an operating winding for said relay, means controlled by said connecting means for connecting said operating winding in series with said one of said sections when said source of current is disconnected therefrom, and means responsive to a predetermined load condition on the other isolated section for completing a relatively low resistance circuit across said one of said sections whereby said operating winding is energized to effect the operation of said connecting means.

4. In combination, a sectionalized circuit including two adjacent electrically isolated sections, a source of current for one of said sections, means for connecting said source to said one of said sections at a point remote from the adjacent ends of said two isolated sections, a polarized relay for effecting the operation of said connecting means, an operating winding for said relay, means controlled by said connecting means for connecting said operating winding in series with said one of said sections when said source of current is disconnected therefrom, and means responsive to a predetermined load condition on the other isolated section for completing a relatively low resistance circuit across said one of said sections whereby said operating winding is energized to effect the operation of said connecting means, and means responsive to a predetermined voltage across said one of said sections for interrupting said low resistance circuit.

In witness whereof, I have hereunto set my hand.

ARVID E. ANDERSON.